(12) United States Patent
Wirth

(10) Patent No.: US 8,168,124 B2
(45) Date of Patent: May 1, 2012

(54) EXHAUST GAS TREATMENT DEVICE AND METHOD

(75) Inventor: Georg Wirth, Kirchheim/Teck (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 971 days.

(21) Appl. No.: 12/044,559

(22) Filed: Mar. 7, 2008

(65) Prior Publication Data
US 2008/0216464 A1    Sep. 11, 2008

(30) Foreign Application Priority Data

Mar. 9, 2007 (DE) .......................... 10 2007 011 956

(51) Int. Cl.
*B01D 50/00* (2006.01)
(52) U.S. Cl. ........................................ 422/177
(58) Field of Classification Search ............... 422/177, 422/180; 60/299
See application file for complete search history.

(56) References Cited

U.S. PATENT DOCUMENTS

| | | | | |
|---|---|---|---|---|
| 3,817,714 A | * | 6/1974 | Wiley | 422/173 |
| 3,958,950 A | * | 5/1976 | DePalma | 422/177 |
| 4,050,245 A | | 9/1977 | Little et al. | |
| 4,235,846 A | * | 11/1980 | Abthoff et al. | 422/171 |
| 4,709,549 A | | 12/1987 | Lepperhoff | |
| 5,408,827 A | * | 4/1995 | Holtermann et al. | 60/298 |
| 6,250,075 B1 | * | 6/2001 | Funakoshi et al. | 60/299 |

FOREIGN PATENT DOCUMENTS

| | | |
|---|---|---|
| DE | 3727217 | 2/1989 |
| DE | 195 08 217 | 9/1996 |
| DE | 102 16 272 | 11/2003 |
| DE | 103 57 953 | 7/2005 |
| DE | 102005002857 A1 | 8/2006 |
| EP | 0236817 A | 9/1987 |
| EP | 1498586 A | 1/2005 |

OTHER PUBLICATIONS

European Search Report for EP 1967709A1, dated Jun. 10, 2008.

* cited by examiner

*Primary Examiner* — Tom Duong
(74) *Attorney, Agent, or Firm* — Howard IP Law Group, PC

(57) ABSTRACT

An exhaust gas treatment device for an exhaust system of an internal combustion engine includes a housing that is adapted to be tied into the exhaust system and at least one exhaust gas purification insert arranged in the housing. The exhaust gas purification insert includes an insert housing which is open at one end and at least one exhaust gas purification element arranged in the insert housing. The housing has at least one insert bracket which has at least one mounting opening on whose opening edge is supported an end section of the insert housing in the form of a ring. The end section forms a first spherical shell segment and the opening edge forms either a second spherical shell segment that is complementary to the first spherical shell segment or a conical jacket segment that fits the first spherical shell segment.

11 Claims, 2 Drawing Sheets

EXHAUST GAS TREATMENT DEVICE AND METHOD

CLAIM OF PRIORITY

This application claims foreign priority of German Patent Application No. DE 10 2007 011 956.0, filed Mar. 9, 2007 in Germany, which application is hereby incorporated by reference its entirety.

FIELD OF THE INVENTION

The present invention relates to an exhaust gas treatment device for an exhaust system of an internal combustion engine. The invention also relates to an exhaust gas purification (emission control) insert for such an exhaust gas treatment device. Furthermore, the invention relates to a method for manufacturing such an exhaust gas purification insert.

BACKGROUND OF THE INVENTION

EP 1 498 586 B1 discloses an exhaust gas treatment device of a type defined in the introduction, having a housing that can be connected to an exhaust system. At least one exhaust gas purification insert having an insert housing that is open at the end is arranged inside the housing. At least one exhaust gas purification element such as a particulate filter or a catalytic converter element is arranged in the insert housing. For mounting this exhaust gas purification insert in the housing, the housing has at least one insert bracket which has at least one mounting opening. An end section of the insert housing is supported on the opening edge of the mounting opening in a ring.

With the known exhaust gas treatment device, the respective opening edge is designed to be cylindrical and is provided with a predetermined constant cross section. The end section of the respective exhaust gas purification insert is also designed to be cylindrical and complementary to the former, so that the respective exhaust gas purification insert can be inserted axially with said end section into the opening edge of the respective insert bracket. It is advantageous here that the dimensions and shaping of the end section can be performed independently of the dimensioning of a housing jacket of the insert housing connected to the end section. In this way, the end sections may always be manufactured to fit the opening edges, whereas the respective insert housing can be adapted independently to the respective exhaust gas purification element whose manufacturing tolerances may be subject to a relatively great scattering.

SUMMARY OF THE INVENTION

The present invention relates to the problem of providing an improved embodiment for an exhaust gas treatment device, an embodiment of which is characterized in particular by simplified mountability.

The invention is based on the general idea of shaping, or designing, at least one of the components, such as the end sections and the respective opening edge of the respective housing bracket, to be curved in the form of a spherical shell segment in the respective exhaust gas purification insert. The other component is then designed to be complementary and/or to fit the respective spherical shell segment shape so that it is either likewise shaped like a spherical shell segment or like a conical jacket. The end section and the respective opening edge are thus designed with a complementary camber to one another. Due to this design, it is possible in particular to change the axial alignment of the insert housing with respect to the insert bracket during assembly, so that deviations in tolerance in particular can be compensated. The spherical design of at least one of the contact surfaces of the opening edge and the end section thus allows an inclination to be set between the longitudinal central axis of the insert housing and the normal direction of an opening plane in which the mounting opening of the insert bracket is situated. Due to the possibility of equalization of tolerance created in this way, the mountability of the exhaust gas treatment device is improved. Furthermore, manufacturing tolerances can be selected to be greater, which allows less expensive production, for example, of the respective insert mount in the housing.

According to an embodiment, the end section and the opening edge may be coordinated with one another, so that the end section protrudes radially beyond the opening edge. Such a design simplifies, for example, the mounting of a weld that is closed in the form of a ring for an airtight connection of the end section to the opening edge.

It is self-evident that the features mentioned above and those yet to be explained below may be used not only in the particular combination given but also in other combinations or alone without going beyond the scope of the present invention.

Exemplary embodiments of the invention are depicted in the drawings and explained in greater detail in the following specification in which the same reference numerals are used to refer to the same or similar or functionally identical components.

DETAILED DESCRIPTION OF THE INVENTION

Figure 1:
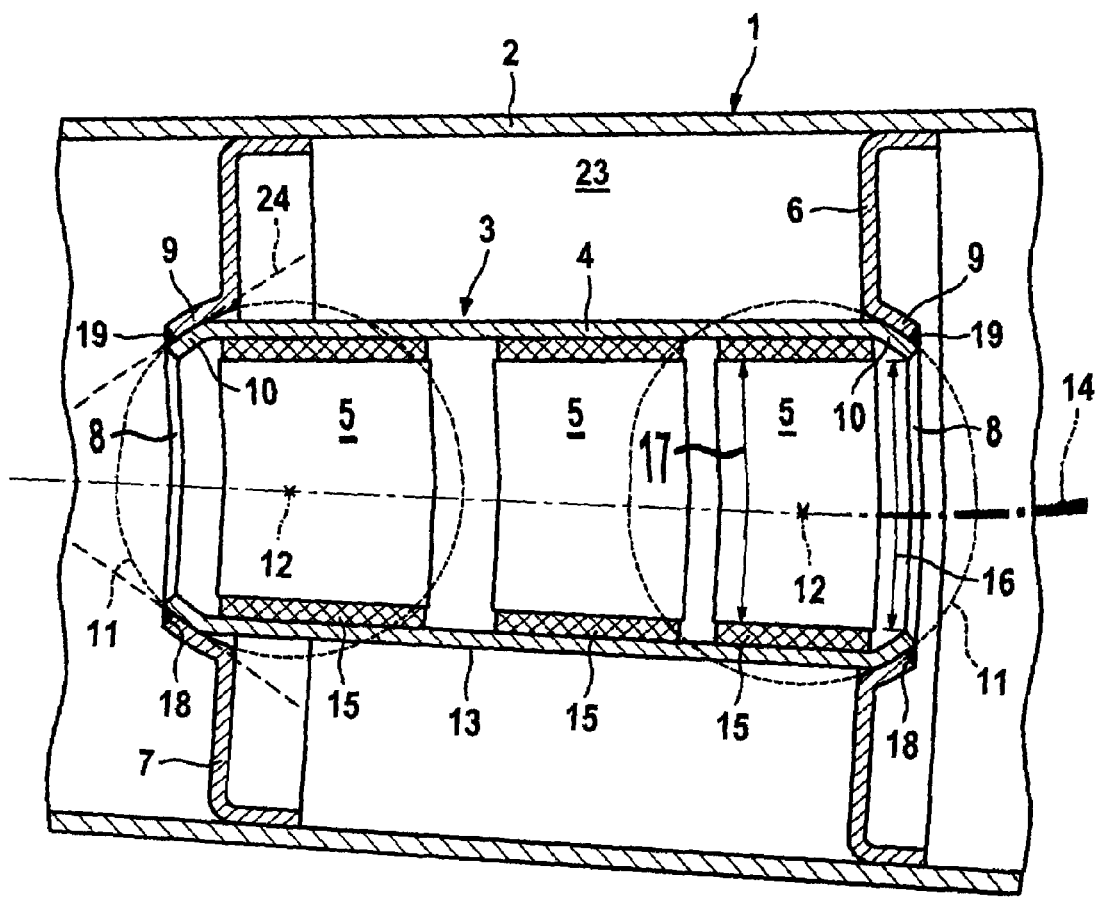
FIGS. 1 and 2 each show a greatly simplified schematic longitudinal section through an exhaust gas treatment device in various embodiments.
Figure 2:
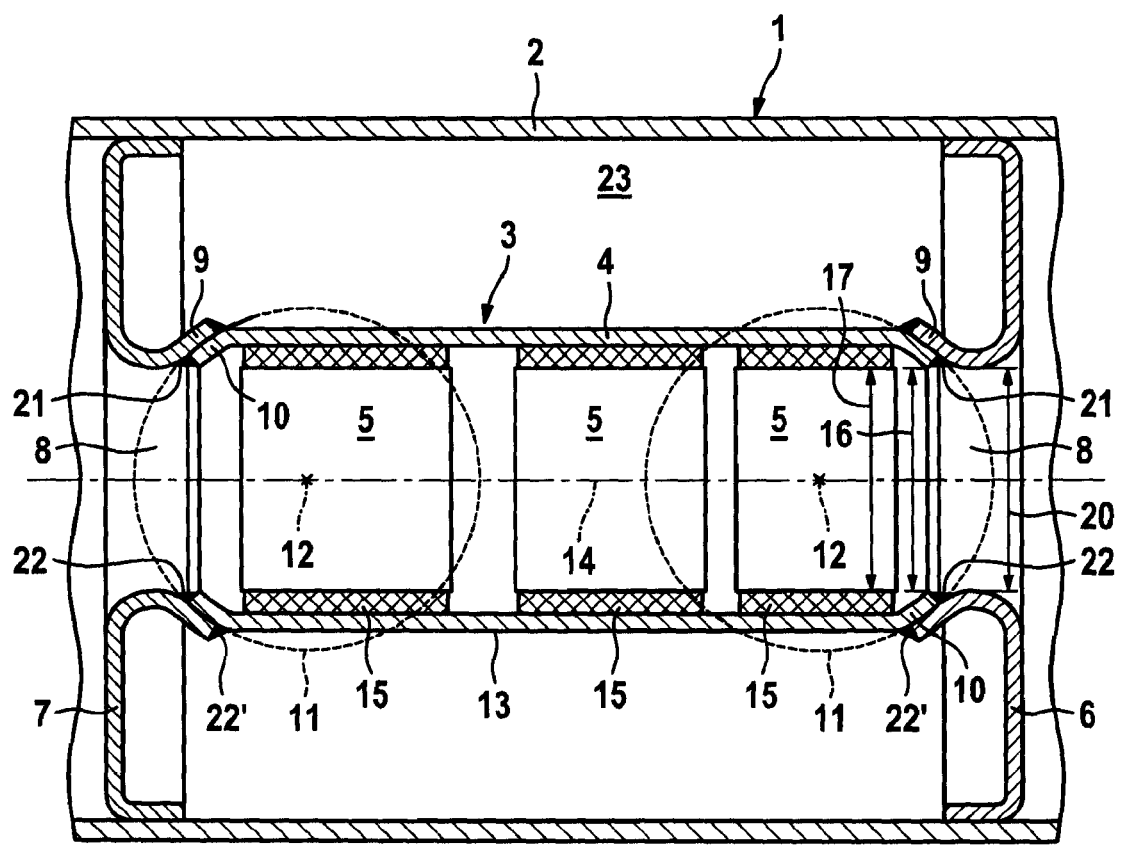

According to FIGS. 1 and 2, an exhaust gas treatment device 1 has a housing 2 in which at least one exhaust gas purification insert 3 is arranged. The exhaust gas treatment device 1 is intended for use in an exhaust system (not shown) of an internal combustion engine, which may be installed, for example, in a motor vehicle. For installation in the exhaust system, the housing 2 can be connected to exhaust gas treatment device 1. This means that the housing 2 has suitable connections (not shown here) allowing the housing 2 and/or the exhaust gas treatment device 1 to be connected to corresponding lines of the exhaust system.

The exhaust gas purification insert 3 is formed by a tubular insert housing 4 that is open on one or both ends and in which at least one exhaust gas purification element 5 is situated. In the example shown here, three exhaust gas purification elements 5 are arranged one after the other in a row in the insert housing 4. Likewise, a different number of exhaust gas purification elements 5 is also conceivable. The respective exhaust gas purification element 5 may be, for example, a particulate filter or a catalytic converter element such as a catalytically coated ceramic monolith, for example. The exhaust gas purification elements 5 may be oxidation catalysts or SCR catalytic converters or the like. In this example, only one exhaust gas purification insert 3 can be discerned. It is clear that two or more such exhaust gas purification inserts 3 may also be arranged in the housing 2.

The housing 2 has two insert brackets 6 and 7. The insert bracket 6 has at least one mounting opening 8 which is surrounded by an opening edge 9 in the form of a ring.

The insert housing 4 has at least one end section 10 which is supported via such an opening edge 9 on one of these insert brackets 6, 7 in the form of a ring. In the example shown here, the insert housing 4 has two such end sections 10, each being supported on one of the insert brackets 6, 7 via such an opening edge 9. If several exhaust gas purification inserts 3 are supported on the respective insert bracket 6, 7, then the respective insert bracket 6, 7 may have a corresponding number of mounting openings 8 and opening edges 9. Likewise, the respective insert housing 4 may be supported with one end section 10 on the opening edge 9 with only one such insert bracket 6, 7 and with the other end section 10 extending through the mounting opening 8 of the other respective insert brackets 6, 7. This other end section 10 is then secured so that it is radially prestressed by the respective opening edge 9, which is preferably slotted, thus allowing an axial sliding seating.

In the exhaust gas purification insert 3 and/or the inventive exhaust gas treatment device 1, the respective opening edge 9 and the respective end section 10 preferably have mutually complementary spherical shell segments to thereby implement a ring-shaped area support between the opening edge 9 and the end section 10. Alternatively, it is also possible to provide for only one of the components, namely the opening edge 9 and the end section 10, e.g., the end section 10, to be designed as a spherical shell segment while the other component, e.g., the opening edge 9, is designed as a fitting conical jacket segment. In this way, a ring-shaped, linear support is likewise implemented between the opening edge 9 and the end section 10.

FIGS. 1 and 2 indicate a virtual and/or imaginary spherical shell 11, each with broken lines. The midpoint or center of this spherical shell 11 is labeled as 12. The respective end section 10 of the insert housing 4 is shaped accordingly, so that its outside contour and/or outside surface forms a spherical shell segment which is part of the spherical shell 11, i.e., is situated inside the latter. The fitting opening edge 9 is shaped to be complementary thereto, so its inside contour and/or inside surface facing the exhaust gas purification insert 3 form(s) a spherical shell segment which is also part of the spherical shell 11, i.e., is situated inside it. The opening edge 9 and the end section 10 can thus be supported in a ring form and with mutual surface contact along a segment of the spherical shell 11. Alternatively, the end section 10 may be situated on the outside or the opening edge 9 may be situated on the inside in a conical jacket 24 (indicated at the left in FIG. 1) on at least one side of the insert housing, so the respective outside contour and the respective inside contour form a conical jacket segment. With such an embodiment, the opening edge 9 and the end section 10 may be supported in a ring shape and with mutual linear contact along the segments of the spherical shell 11 and the conical jacket 24.

The selected shaping for the end section 10 and the opening edge 9 allows an alignment of the exhaust gas purification insert 3 in relation to the respective insert bracket 6, 7 in the form of a rotational movement about the center 12 during its assembly. In this way, assembly of the exhaust gas treatment device 1 is facilitated because manufacturing tolerances can be compensated more easily.

With the embodiments illustrated here, the shaping of the end section 10 and the opening edge 9 is preferably accomplished so that the center 12 of the respective spherical shell 11 is situated in the interior of the insert housing 4. As a result, the respective end section 10 protrudes radially inward with respect to a housing jacket 13 of the insert housing 4 connected to the respective end section 10. Said housing jacket 13 is designed to be cylindrical, preferably circularly cylindrical. A longitudinal central axis 14 of the insert housing 4 defines an axial direction for the respective exhaust gas purification insert 3.

With the embodiments shown here, the three exhaust gas purification elements 5, which are arranged axially one after the other in the insert housing 4, are each surrounded in a ring by a bearing jacket 15 in the circumferential direction. A shared bearing jacket 15 may also be provided. The respective bearing jacket 15 consists of a traditional thermally insulating bearing jacket with the help of which the individual exhaust gas purification elements 5 are held in the insert housing 4 under a radial prestress. The respective end sections 10 are preferably shaped so they protrude by a predetermined amount radially inward with respect to the housing jacket 13. Said amount is preferably selected so that the respective end section 10 overlaps with the bearing jacket 15 of the neighboring exhaust gas purification element 5 in the axial direction. Therefore, the respective end section 10 forms an edge protection for the neighboring exhaust gas purification element 5. On the other hand, the end section 10 thereby prevents the bearing jacket 15 from being exposed to hot exhaust gases.

The end sections 10 are preferably bent inward to form that an open cross section 16 for the respective end section, corresponding substantially to a flow-through cross section 17 of the respective exhaust gas purification element 5. In other words, the open cross section 16 of the respective end section 10 is approximately the same size as the flow-through cross section 17 of the neighboring exhaust gas purification element 5.

In the embodiment illustrated in FIG. 1, the end section 10 protrudes radially inward beyond the respective opening edge 9. This forms a groove 18 that is open axially and runs peripherally in a ring pattern. A peripheral weld 19, in particular a fillet weld in the form of a ring, may expediently be provided in this groove 18 to attach the insert housing 4 to the respective insert bracket 6, 7. In the example shown here, said weld 19 connects an end face (not shown) of the opening edge 9 to the spherical outside of the end section 10. In the embodiment shown in FIG. 1, the weld 19 can be implemented in an automated process especially easily.

An advantage of the spherical design of the respective end section 10 and the respective opening edge 9 may be regarded as the fact that the spherical shape of the end section 10 may always be implemented with the same radius, which is selected to be complementary to the radius of the respective opening edge 9, regardless of the respective shaping of the remainder of the insert housing 4. In particular, the diameter of the cylindrical and/or circular cylindrical housing jacket 13 can be selected independently of the radius of the end section 10, which is in the shape of a spherical shell segment. In this way, the insert housing 4 can be adapted easily to differences in diameter of the exhaust gas purification elements 5 due to tolerance in the area of the jacket 13 of the housing, while at the same time the respective end section 10 is adapted to the respective opening edge 9.

In the embodiment shown in FIG. 1, the opening edge 9 is shaped so that it points away from the respective insert bracket 6, 7 and protrudes away from the insert housing 4. In contrast with that, FIG. 2 shows a different embodiment in which the respective opening edge 9 protrudes away from the respective insert bracket 6, 7 toward the insert housing 4. In this embodiment, the opening edge 9 has a comparatively complex shape. The respective opening edge 9 here forms an inlet funnel and/or an outlet funnel with a rounded flow contour for the respective exhaust gas purification insert 3. This makes it possible to reduce the flow resistance of the exhaust gas treatment device 1. In particular, the mounting opening 8 of the respective insert bracket 6, 7 has an open cross section 20 that corresponds to the flow-through cross section 17 of the respective exhaust gas purification element 5. With a suitably dimensioned end section 10, a ring-shaped groove 21 that is open on the inside radially may be formed on an axial end face of the end section 10, which is not defined further here, such that a weld 22 can be applied along this groove to connect the insert housing 4 to the respective insert bracket 6, 7. As an alternative to this, an externally closed weld 22' in the form of a ring may also be provided, connecting the end face of the opening edge 9 to the end section 10 on the outside.

An airtight connection between the insert housing 4 and the respective insert bracket 6, 7 can be implemented due to the respective weld 19 and/or 22 and/or 22' which is designed to be closed in the form of a ring.

In the embodiments shown here, the housing 2 contains a muffler space 23. The respective insert housing 4 passes through this muffler space 23. In these examples, the muffler space 23 surrounds the insert housing 4 in the circumferential direction. The muffler space 23 may be an absorption space, for example, which may be filled with a suitable sound-absorbing material. Likewise, the muffler space 23 may be a reflection chamber or a resonance chamber, in particular a Helmholtz resonator. The insert brackets 6, 7 shown here form an intermediate plate and/or a partition within the housing 2 to reinforce the housing 2 and/or for an airtight boundary of the muffler space 23.

Manufacturing of the exhaust gas purification insert 3 and/or the exhaust gas treatment device 1 is preferably performed as follows:

First, the at least one exhaust gas purification element 5 with the bearing jacket 15 is introduced into the insert housing 4. The insert housing 4 has the same cross section on at least one of its ends, preferably on both ends, as in the area of its housing jacket 13 at this point in the manufacturing process. The introduction of the respective exhaust gas purification elements 5 together with their respective bearing jacket 15 into the insert housing 4 can be implemented in different ways. For example, the insert housing 4 may have a comparatively large inside cross section in a starting condition, so that the exhaust gas purification elements 5 can be inserted axially into the cylindrical insert housing 4 with the bearing jacket 15 uncompressed. Then the insert housing 4 can be reduced with regard to its inside cross section and can also be reduced automatically with regard to its outside cross section until the desired radial pressure on the respective bearing jacket 15 is established. Likewise, it is fundamentally possible for the respective exhaust gas purification element 5 together with the bearing jacket 15 to be pressed axially into the insert housing 4 through a funnel.

After introducing the exhaust gas purification elements 5, the insert housing 4 is shaped on its respective end section 10 so that the desired end section 10 in the form of a spherical shell segment is formed from the end section 10 that had been cylindrical until then. The shaping of the respective end section 10 may be performed after a reduction in cross section of the insert housing 4 or simultaneously with the reduction in cross section of the insert housing 4.

In this procedure, it is advantageous that the shape of the respective end section 10 in the form of a spherical shell segment can be implemented completely independently of the final cross section of the insert housing 4. This makes it possible to create a clearly defined mechanical interface between the respective exhaust gas purification insert 3 and the respective insert bracket 6, 7. At the same time, this preserves the possibility of adapting the respective insert housing 4 to cross sections of the exhaust gas purification element 5 that are different due to tolerance.

What is claimed is:

1. An exhaust gas treatment device for an exhaust system of an internal combustion engine, said device comprising:
   a housing adapted to be tied into the exhaust system;
   at least one exhaust gas purification insert situated in the housing;
   wherein the exhaust gas purification insert comprises an insert housing which is open at one end and in which insert housing at least one exhaust gas purification element is situated,
   wherein the housing comprises at least one insert bracket which has at least one mounting opening on whose opening edge an end section of the insert housing is supported in the form of a ring, and
   wherein the end section of the insert housing forms a first spherical shell segment, and the opening edge forms either a conical jacket segment that fits the first spherical shell segment or forms a second spherical shell segment that is complementary to the first spherical shell segment.

2. The exhaust gas treatment device according to claim 1, wherein a centre of an imaginary spherical shell on which the opening edge is in contact with the end section is situated in the inside of the insert housing.

3. The exhaust gas treatment device according to claim 1, wherein the end section protrudes radially inward beyond a cylindrical jacket of the housing.

4. The exhaust gas treatment device according to claim 3, wherein the end section protrudes radially inward so far that it overlaps axially with a bearing jacket sheathing the respective exhaust gas purification element.

5. The exhaust gas treatment device according to claim 3, wherein the end section protrudes radially inward so far that an opening cross section of the end section corresponds substantially to a flow-through cross section of the respective exhaust gas purification element.

6. The exhaust gas treatment device according to claim 1, wherein the end section protrudes radially beyond the opening edge.

7. The exhaust gas treatment device according to claim 1, wherein the opening edge is connected at the end to the end section by at least one weld.

8. The exhaust gas treatment device according to claim 1, wherein the end section is connected at the end to the opening edge by at least one weld.

9. The exhaust gas treatment device according to claim 1, wherein the opening edge protrudes away from the insert bracket facing away from the insert housing.

10. The exhaust gas treatment device according to claim 1, wherein the opening edge protrudes away from the insert bracket facing toward the insert housing.

11. The exhaust gas treatment device according claim 1, wherein the housing further comprises a muffler space through which the insert housing passes.

\* \* \* \* \*